March 19, 1940. J. A. DOVE 2,194,385
MEANS FOR SHAPING TUBES OR CONTAINERS
Filed Aug. 30, 1937 7 Sheets-Sheet 1

March 19, 1940.  J. A. DOVE  2,194,385
MEANS FOR SHAPING TUBES OR CONTAINERS
Filed Aug. 30, 1937   7 Sheets-Sheet 2

March 19, 1940.   J. A. DOVE   2,194,385
MEANS FOR SHAPING TUBES OR CONTAINERS
Filed Aug. 30, 1937   7 Sheets-Sheet 5

INVENTOR,
John A. Dove
BY
ATTORNEYS.

March 19, 1940.    J. A. DOVE    2,194,385
MEANS FOR SHAPING TUBES OR CONTAINERS
Filed Aug. 30, 1937    7 Sheets-Sheet 6

INVENTOR,
John A. Dove
BY
Barker & Collings
ATTORNEYS

Patented Mar. 19, 1940

2,194,385

UNITED STATES PATENT OFFICE 2,194,385

MEANS FOR SHAPING TUBES OR CONTAINERS

John Arthur Dove, Sutton-in-Ashfield, England, assignor to Barringer, Wallis & Manners Limited, Mansfield, England Application August 30, 1937, Serial No. 161,707
In Great Britain September 25, 1936

8 Claims. (Cl. 113—52)

This invention is for a means for shaping tubes or containers and is concerned primarily with the shaping of thin sheet metal articles by the exercise of pressure thereon at the part or parts to be shaped.

An important object of the invention is to provide a machine or apparatus whereby either solid drawn or seamed tubes or containers can be shaped or bulged with equal facility by unskilled labor, and whereby comparatively hard or comparatively soft sheet metals can be worked equally well.

The present invention provides a machine for shaping tubular or cylindrical articles such as metal tubes or containers by expanding or bulging same, comprising, in combination, means for supporting the work, a tool rotatable about a constant axis, means for effecting rotation of said tool, one or more members associated with the tool and adapted during rotation of the tool to be radially displaced relatively thereto, and to apply pressure to the interior of the work for shaping same, means for effecting axial or longitudinal movement of the work simultaneously with the rotation of the tool, and means associated with said tool functioning automatically to control the outward radial displacement of said member or members.

By the employment of a machine having a rotatable shaping tool and wherein the work is moved longitudinally or axially during the rotation of the tool, the shaping or spinning of seamed articles can be successfully accomplished without danger of bursting or collapsing the seam.

A subsidiary feature of this invention resides in an expanding tool for shaping tubular sheet metal members comprising a head, and a plurality of pressure elements mounted thereon in a circumferential series for movement to an exposed position. These pressure elements are preferably constituted by balls, although rollers or non-rotational elements such as plungers or plates may be employed. Desirably the pressure elements are arranged to be moved outwards by centrifugal force upon rotation of the tool, although alternatively, or additionally, means may be provided for controlling the outward movement.

In order that the invention may be better understood reference will now be made to the accompanying drawings, in which Figure 1 is a plan of one form of machine according to this invention, while Figure 3 is a front elevation of a further machine according to this invention, while.

Figures 12, 13 and 14 are longitudinal sections through other tools, while

Figure 15 is a section through the tool shown in Fig. 14.

This machine comprises a bed 10 on which a headstock (indicated generally at 11 in Fig. 1) is slidably mounted towards and away from a spinning tool 12. Conveniently the mounting for the headstock and the tool consists of two horizontal parallel spaced bars 13, 14 suitably supported at their ends as at 15, 16. The headstock consists of two brackets 17, 18 that span the said bars and carry means for locating the tubular container 19 to be spun. The bracket 17 has attached to it externally screwed sleeves 20, 21 through which the mounting bars extend, the bracket 18 having like sleeves 22, 23, and corresponding sleeves (that encircle one and the same support bar) are connected by a knurled sleeve screwed on to them so that by rotating these knurled sleeves 24, 25 (which are desirably provided with locking nuts) the size of the headstock may be adjusted to accommodate containers of different lengths.

That bracket 18 which is nearest the tool is provided with an aperture to permit the tool to pass through it into the member to be spun and it is provided with an attachment comprising a projecting spigot 26 adapted to receive one end of the container within it and to prevent said end from expanding, and with a projecting spring ring or clamp 27 adapted to be received within the said end of the container and to prevent that end from collapsing when the spinning operation is proceeding. The other bracket 17 of the headstock is provided with a somewhat similar attachment but it may be mentioned that this attachment is carried upon the end of a sleeve 28 that is rotatably mounted upon a boss 29 projecting centrally from the bracket, there being a pin and inclined slot connection between the boss and the sleeve and a handle 30 upon the latter so that by rotating the sleeve the attachment may be caused to approach or recede from that first-mentioned to facilitate the insertion or removal of a container. These attachments are preferably removable, interchangeable attachments of various diameters being provided.

It has been mentioned that it is preferred to operate on containers while they are in the open-ended condition. At this stage it is usual that one end of the container is beaded over, while the other one (which subsequently receives the end-walls) is merely flanged outwards or inwards. It is this flanged end that is received in the adjustable attachment, and in order to hold the container from rotation while spinning proceeds the interior periphery of the spigot is milled or knurled so as to grip the edge of the flanged-out end. Either end may be so received, however.

The headstock may be moved along the support bars 13, 14 by means of a rack of teeth 31 formed upon a rod 32 that projects from it centrally of the two support bars and a pinion 33 meshing with said rack. The traverse may be either automatic or manually operated.

Mounted mid-way between the support bars and co-axial with the headstock there is a spinning tool 12 adapted to be rotated in any convenient manner. This spinning tool consists of a head provided with a plurality of pressure elements adapted to move outwards and to make contact with the interior of the member to be spun at circumferentially spaced locations and thereby to exercise the outward pressure necessary to bulge the said member. In a simple form of tool these pressure elements consist of three or more hard steel balls 34 arranged to fly outwards under centrifugal force, the said balls being carried in holes 35 drilled radially in the head of the tool, means being provided for terminating their outward movement when they reach a position at which they project slightly beyond the periphery of the tool head. In the case of a small diameter tool, however, if centrifugal force is found to be insufficient to produce the necessary outward pressure on the member to be spun, mechanical means may be provided for moving the balls outwards. To this end the tool head, in one construction shown in Fig. 2, comprises two concentric rings, the outer one 36 having its inner edge chamfered and the inner one 37 having its outer edge chamfered to provide a V-shaped groove or race in which the balls 34 are positioned and against which they are pressed by a spring loaded collar 38 at the end of the tool. Therefore if the inner ring is moved along the tool the balls are pressed outwards, the collar yielding to permit them to move. This movement of the inner ring is effected by a control spindle 39 that extends axially along the shaft 40 of the tool, and at its projecting outer end is engaged by a cam or the like operated in any suitable manner. Various forms of tools applicable for use in a machine according to this invention are hereinafter described.

The control member or spindle 39 that extends longitudinally within the shaft 40 of the tool may be operated by a cam 41 movable transversely of the machine. For this purpose the cam 41 may be attached to a flexible control such as the chain 42 that extends from a point 43 of attachment on the headstock, parallel with one of the support bars 13, round a pulley 44 attached thereto and transversely to the cam; thence it extends round a similar pulley 45 on the other support bar 14, parallel with that bar towards the headstock, around a fixed pulley 46 and back to the headstock. Hence movement of the headstock in one direction causes transverse movement of the cam in a certain direction and movement of the headstock in the reverse direction causes a reverse movement to the cam. Means may be provided at the points of attachment of the chain for adjusting its length, as shown.

An adjustable stop 47 is provided for determining the traverse to the left of the headstock, while adjustable stops 48, 49 are provided for determining its traverse to the right. Additionally means are provided for adjusting the cam 41 towards the headstock so that after the work has been formed to a certain contour and of a certain width by the traverse of the cam 41 the latter may be adjusted towards the headstock and by a further traverse caused to bulge the work to a still greater diameter or width. The cam 41 travels along an inclined wedge 50 which is backed by a like inclined member 51 on the frame of the machine. Therefore by adjusting the wedge member 50 longitudinally, the cam 41 may be pushed towards or permitted to recede from the headstock. This adjustment is effected by means of a handle 52 secured to the stop shaft 49 and provided with a pin 53 for engaging an adjustable abutment 54 on the wedge member 50. The movement of the handle 52 in the downward direction to force the cam 41 towards the headstock is limited by a stop 55.

Figure 2:
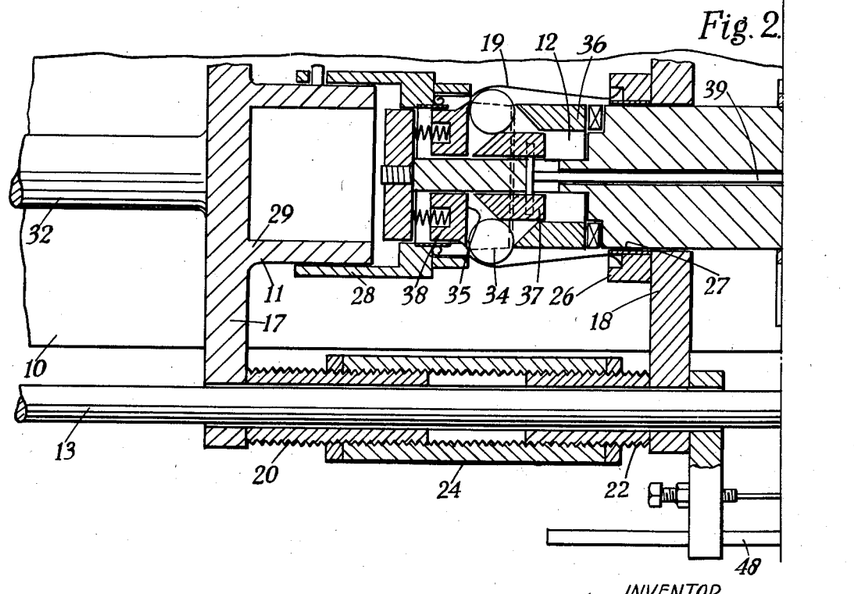
Figure 2 is a section thereof on a larger scale.

As will be appreciated, if after the work-piece 19 shown in Fig. 2 has been bulged to the diameter shown the cam 41 is adjusted to bulge the work-piece to a greater diameter at a second traverse of the headstock, the pressure balls will be forced outwards and there will be a danger of cutting the work-piece between said balls and the edge of the external sleeve on the headstock which receives the work-piece. Therefore at the same time that the cam 41 is adjusted it is desirable to move the headstock away from the tool by a slight amount. Hence the stop shaft 48 rotated by the handle 52 carries a ramp 57 engaging a corresponding ramp 58 on the machine frame so that when the handle 52 is turned the stop shaft 49 is moved to the left with a corresponding movement of the headstock. The stop shaft 49 is biassed to the right by a spring 56.

If relative rotational movement is effected between the work-piece and the tool (as it may be by driving the tool shaft 40 from a motor indicated at 59) while movement of the work-piece takes place, the latter is bulged or shaped cylindrically. If, however, the tool is held from rotation, the tools or other pressure elements in the tool form longitudinal flutes or like enlargements of the work-piece such as are shown by way of example in Fig. 11.

Figure 1:
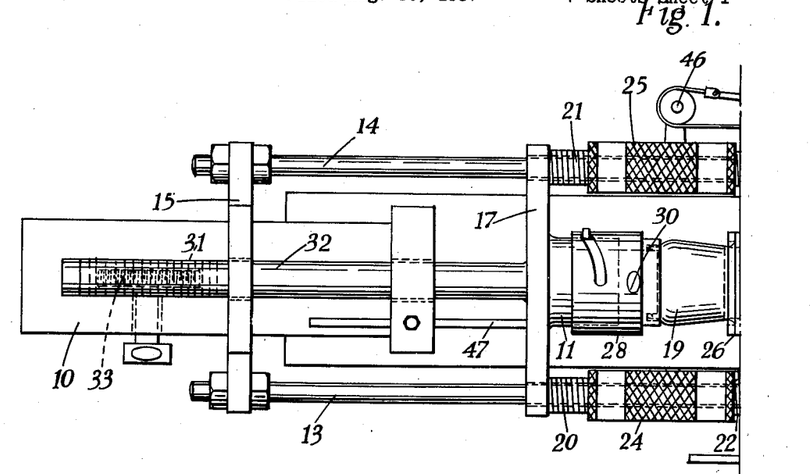
Figure 3:
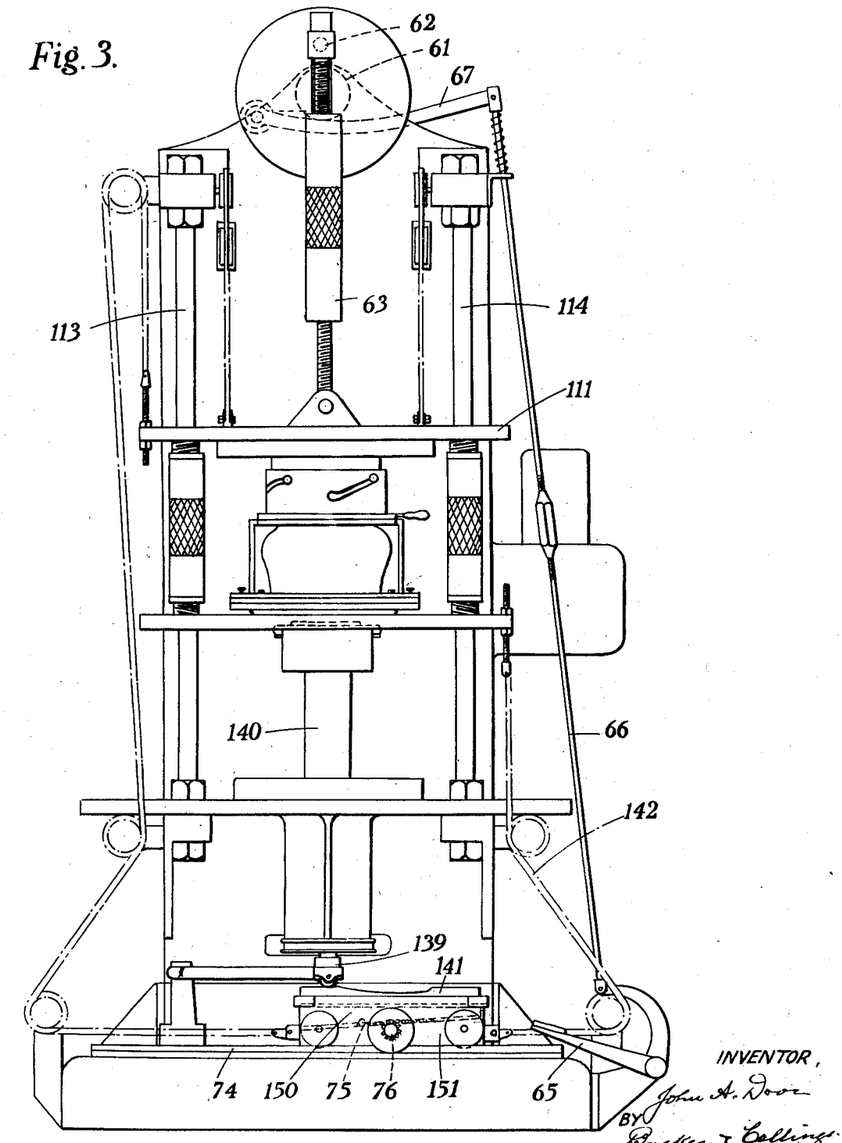
Figure 4:
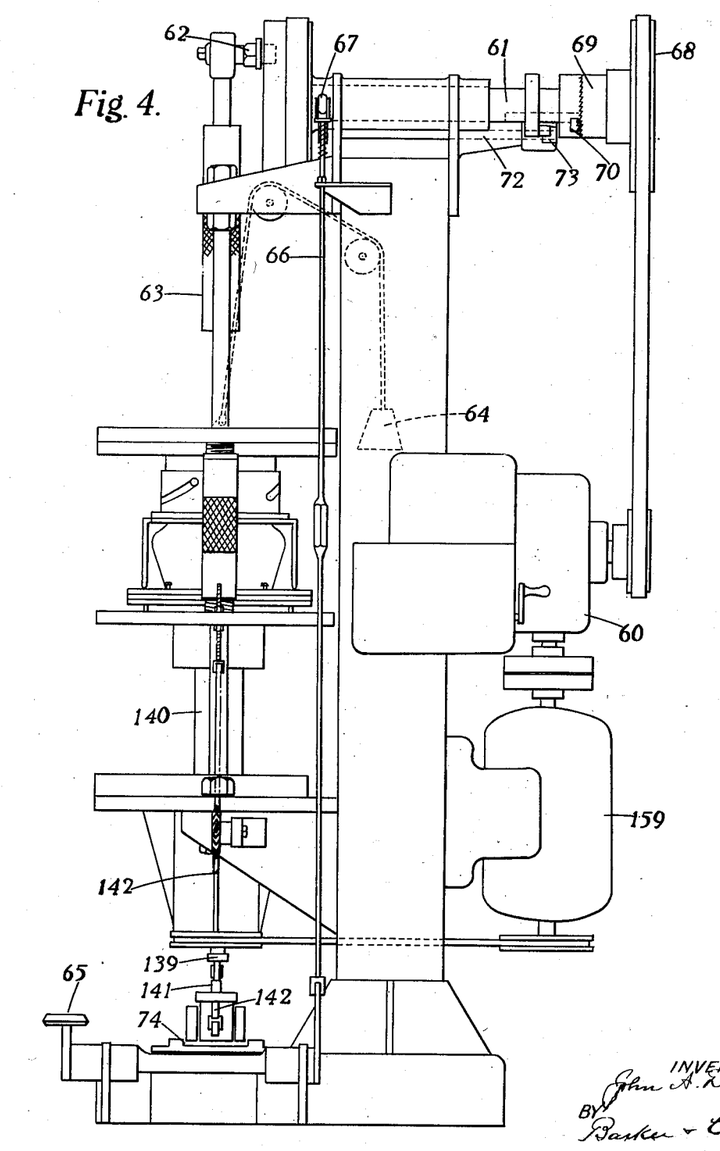
Figure 4 is a side elevation thereof.
Figure 6:
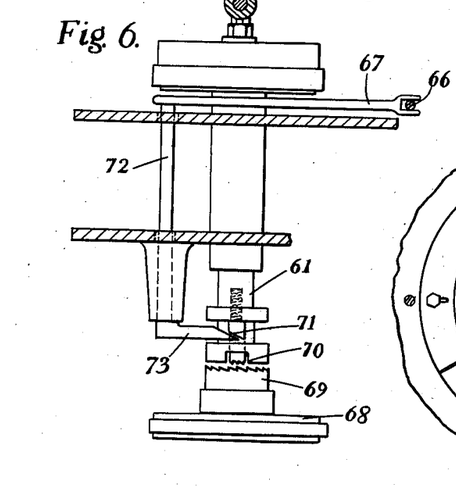
Figure 6 is an inverted view of a clutch in the machine.

In Figs. 3 and 4 the machine is in the main similar to that shown in Figs. 1 and 2, but is arranged to reciprocate vertically, the headstock 111 being slidably mounted for movement on vertical bars 113 and 114. The tool shaft 140 is driven by means of a motor 159 and this motor is arranged to drive, through a gear box 60, a crank shaft 61. On this shaft there is a crank pin 62 connected by an adjustable connecting rod 63 to the headstock so that the latter is reciprocated by power. Conveniently the said headstock is provided with counterweights such as indicated at 64. The reciprocation is controlled by a clutch pedal 65 connected by a rod 66 to a lever 67, and the details of the clutch are shown in Figs. 4 and 6. The motor drives the shaft 61 by means of a loose pulley 68 provided with a dog clutch member 69. Fast on the shaft 61 there is a corresponding spring pressed clutch member 70 provided with a ramp 71. Normally the two clutch members are in engagement and the shaft 61 is connected to the motor. When the clutch pedal 65 is depressed, however, a control shaft 72 is rocked by the lever 67 to bring a finger 73 thereon into the track of the ramp 71. The latter in its rotational travel strikes the finger 73 and the clutch member 70 is thereby forced out of engagement with the corresponding clutch member 69, and the shaft 61 and the headstock brought to a standstill.

The control spindle 139 for the tool is operated by a cam 141 which is traversed horizontally on a track 74 by means of a driving chain 142 as the head is reciprocated. The cam is mounted on a wheeled carriage consisting of upper and lower wedge-shaped parts 150 and 151 respectively. The upper part 150 is provided with a rack of ratchet teeth 75 so that it may be adjusted along the lower part 151 by a pinion 76, and the cam 141 thereby raised and lowered on the carriage.

Figure 8:
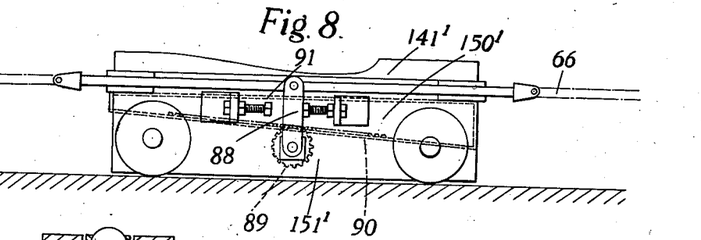
Figure 8 is a detail of the said machine.
Figure 16:
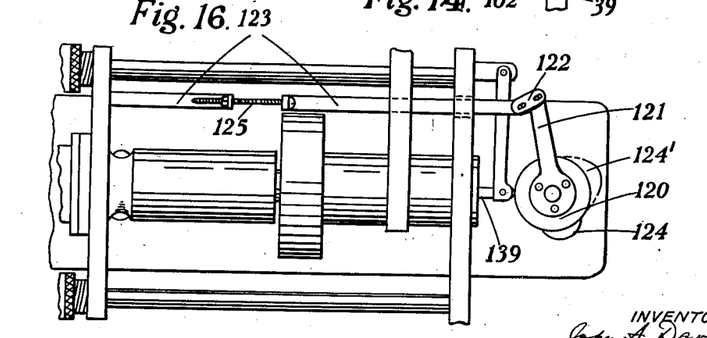
Figure 16 illustrates the use of a rotatable cam in the machine.

An alternative arrangement of cam carriage is shown in Fig. 8. The cam carriage consists of upper and lower wedged shaped parts 150$^1$ and 151$^1$ respectively. The chain 66 is connected to a lever 88 pivoted in the lower part 151 and connected to a pinion 89 engaging with a rack of ratchet teeth 90 on the upper part 150$^1$, the movement of the said lever 88 being governed by stops 91. This arrangement ensures that at the commencement of the traverse of the headstock in either direction the part 150$^1$ is slid between the cam 141$^1$ and the part 151$^1$ and the cam thereby raised or lowered before the traverse of the cam commences. A rotatable cam may be employed instead of a traversing cam such as 41, 141, or 141$^1$. An arrangement embodying a rotatable cam is illustrated in Fig. 16. Here the cam is shown at 120 fixed to a disc at the end of a cam arm 121, the opposite end of said arm being connected by a link 122 to the bar 123 attached to the work clamp, said bar 123 being guided for longitudinal movement in the machine frame. During the to and fro movement of the workholder, swivelling motion is imparted to the cam arm 121, thereby oscillating or partly rotating the cam 120, the cam rise on which is so located and designed as to transmit the required axial movement to the central control member or spindle 139. The cam may have two rises, 124 and 124$^1$ so disposed that one rise acts on one movement of the tool control spindle 139 and the other rise functions on the return movement. An adjusting screw 125 in the bar 123 enables the cam and work clamp to be set in correct relationship for the work being accomplished.

Figure 5:
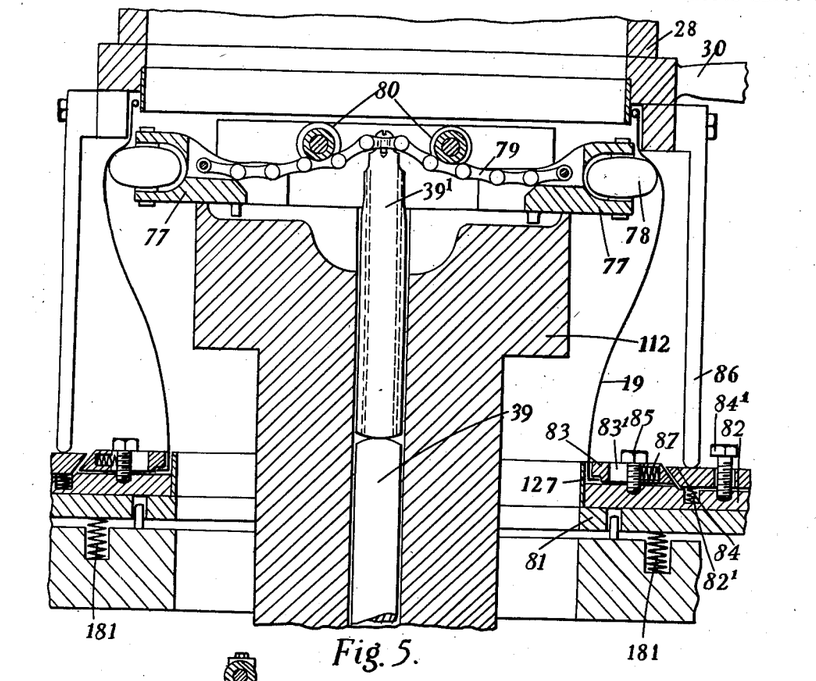
Figure 5 is a section showing the tool employed in the machine.
Figure 7:
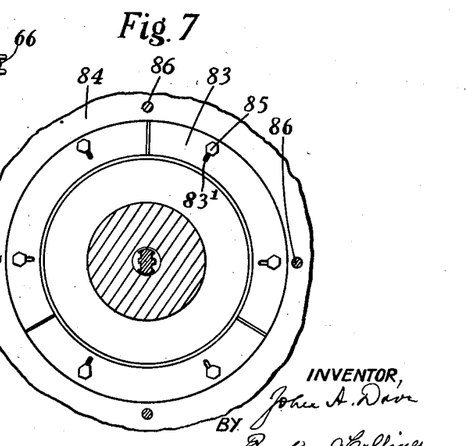
Figure 7 is a plan of a work clamp which is utilized in the machine of Figs. 4 and 5, but which may be utilized in any machine according to the invention.

In certain instances it is desirable to secure the work-piece 19 firmly to the headstock by a clamping device which operates simultaneously to secure both ends of the work-piece or release same. A suitable arrangement is shown in Figs. 3, 5 and 7. The device consists of an inner spigot 127 and a ring 81 carrying a second ring 82 on which is mounted a segmental ring 83 having an external taper face. Encircling the segmental ring 83 is an annular ring 84 having its internal periphery tapered to coincide with the taper on the segmental ring 83. The segments of the ring 83 are radially displaceable on studs 85 working in slots 83$^1$, while the external ring 84 is vertically movable on studs 84$^1$ against springs 82$^1$ carried by the ring 82. When the before-described sleeve 28 is rotated by the handle 30 so as to clamp the top of the container 19, the downward movement imparted to said sleeve 28 is transmitted through the depending arms 86 so as to press same downwardly, and in doing so the taper face on said ring 84 coacts with that on the segmental ring 83 and moves the segments of this ring inwardly to clamp the bottom of the container 19. When the handle 30 is moved in an opposite direction springs 82$^1$ lift the ring 84 and permit the segmental ring 83 to move out under the influence of springs 87 and release the bottom of the container. The aforesaid clamping device for the container is advantageously carried on the machine frame on compression springs 181 or equivalent cushioning elements, there being provided pins or other members for locating the clamp.

One form of tool suitable for use both in the vertical and in the horizontal machine is shown in Fig. 5. The tool head 112 is slotted diametrically to receive a plurality of diametrically disposed carriages 77 each of which at its outer end supports a rotatable roller or ball 78 here shown as of oval form. Diametrically opposed carriages 77 are connected by a flexible connection such as the chain 79 which passes over the hardened end 79$^1$ of the control spindle and under small pulleys such as 80. Therefore the relative upward movement of the spindle 39 limits the extent to which the pressure elements 80 are thrown outwards by centrifugal force and may be employed to retract them.

Figures 9, 10, 11:
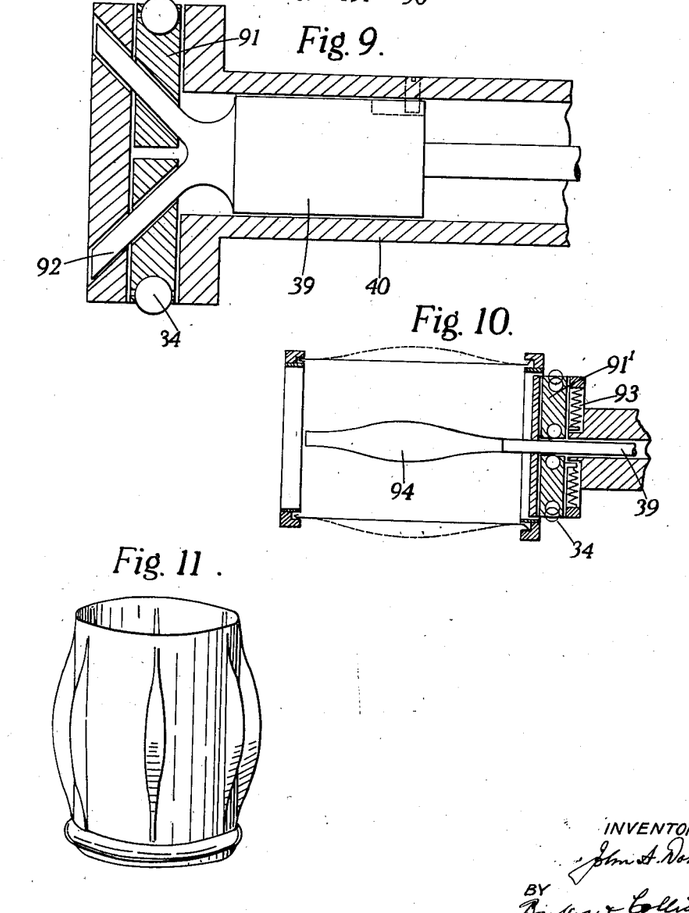
Figures 9 and 10 are longitudinal sections of two forms of tool according to this invention.
Figure 11 is a perspective view showing work which can be formed by the tool of Fig. 10.

Fig. 9 shows a tool in which the projection of the pressure elements 34 under centrifugal force is controlled, or their projection and retraction is effected, by mechanical means. For this purpose the pressure elements here shown as balls are mounted in plungers 91 suitably disposed in radial bores in the tool head. The control shaft 39, which is slidably keyed in the interior of the tool shaft 40, is provided with a number of divergent prongs 92 which pass through bores in the plungers 91 so that relative longitudinal adjustment of said shaft 39 in the shaft 40 determines the radial position of the pressure elements 34.

In the arrangement illustrated in Fig. 10 the pressure elements 34 are again mounted in plungers 91 in the head of the tool, but are urged inwards by springs 93, their outward projection being determined by a suitably shaped swelling 94 on the end of the control shaft 39. By holding this tool from rotation flutes, as shown in Fig. 11, are produced. With this tool a traversing cam such as 41 is unnecessary, for the part 94 may be restrained from traversing with the tool.

Figures 12, 13, 14, 15:
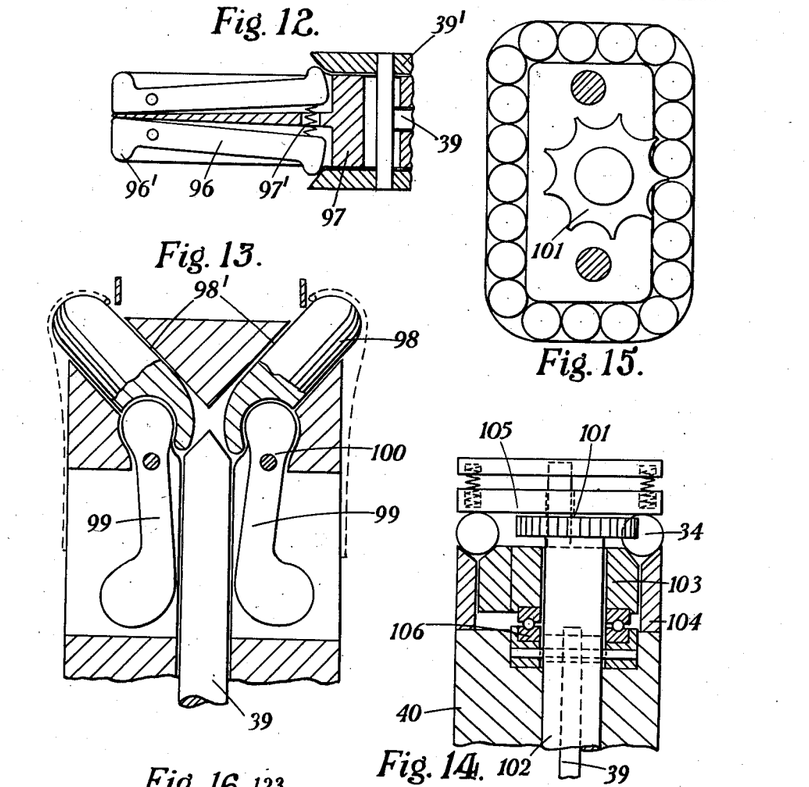

In the tool shown in Fig. 12 a plurality of levers 96 pivoted in the tool head 97 are employed as pressure elements. The operative ends 96$^1$ of these levers are normally contracted by means of a compression spring 97$^1$, while they are expanded by means of a sleeve 39$^1$ slidable lengthwise of the tool under the control of the spindle 39. The operative ends 96$^1$ of the levers 96 may have small rollers rotatably fitted thereat.

It is sometimes desirable to form an annular bulge or rim at the end of the work-piece, the shape desired being indicated in dotted lines in Fig. 13. For this purpose the pressure elements 98 are slidably guided in radial or diagonal slots or guides 98¹ drilled or otherwise formed in the head, there being also balance-weight levers 99 pivoted at 100 towards their upper ends in slots or recesses formed longitudinally in the head, the upper ends of said balance weight levers having a knuckle connection with the slidable pressure elements 98. When the head is rotated centrifugal force throws outwards the lower weighted ends of the two levers 99, and this movement is reversed above the pivots 100 so as to draw inwardly the radially movable pressure members 98. The outward ends of the members 98 are drawn inwardly within the diameter of the tool head thrusting back the push rod 39, and when the tool has been inserted within the container to the required distance the push rod 39 is thrust forward by a cam as before-described and in so doing the pressure members 98 are pushed outwardly radially beyond the diameter of the head, the degree of outward movement depending upon the shape of the cam. The parts of the pressure members 98 actually engaging with the work may, with advantage be constituted by small rollers or their equivalent rotatably mounted at the end of said members.

A tool for profiling a multi-sided container is shown in Figs. 14 and 15. In this tool the balls 34 are traversed around a race of the same shape as the section of the container by means of a gear wheel 101 gearing with them and mounted on a spindle 102 rotatable inside the stationary shaft 40 of the tool. The race is constituted by interior and exterior bevelled members 103 and 104 and the balls are held therein by means of a spring-pressed plate 105. The radius of action of the ball is progressively varied by moving the inner member 103 longitudinally of the outer member by means of thrust bearing 106 and the control spindle 39. This tool does not necessitate rotation between it and the work-piece, only the shaft 102 being rotatable.

It will be understood that any of the tools shown in Figs. 2, 5, 9, 10, 12, 13, 14, and 15, may be employed in each of the machines described.

I claim:

1. A machine for shaping tubular or cylindrical articles such as metal tubes or containers by expanding or bulging same comprising, in combination, means for supporting the work, a tool rotatable about a constant axis, said tool being provided with one or more members mounted for radial displacement during rotation whereby to engage and apply pressure to the interior of the work for shaping same, means for effecting rotation of said tool, means for effecting axial or longitudinal movement of the work simultaneously with the rotation of the tool, and means associated with said tool functioning automatically to control the outward radial displacement of said member or members.

2. A machine for shaping tubular or cylindrical articles such as metal tubes or containers comprising, in combination, means for supporting the work at each end, a tool embodying pressure-exerting means radially displaceable outwards to make contact with and exert pressure on the interior of the work, means for effecting rotation of said tool, means for effecting longitudinal or axial traversing movement of the work simultaneously with the rotation of the tool, means functioning automatically to control the outward radial displacement of said pressure-exerting means during the traverse of the work and said last named means comprising a cam and means interconnecting said cam with the traversing means so as to effect movement of the cam simultaneously with the traverse.

3. A machine according to claim 2 and wherein a tapered member associated with the pressure-exerting means is arranged to co-operate with said cam device to determine the degree of outward radial displacement of said pressure-exerting means.

4. A machine for shaping tubular or cylindrical articles such as metal tubes or containers by expanding or bulging same comprising in combination a bed, a head-stock, a tool-holder, means on the head-stock for holding the work and presenting an open end of it to a tool on the tool-holder, means for effecting reciprocation of the head-stock, means for imparting rotation to the tool during said reciprocating motion, a plurality of pressure members carried by the tool and movable outwards to exert pressure on the work at circumferentially spaced positions, a member movable longitudinally of the tool for controlling said outward movement, a cam for controlling the longitudinal movement of said member, and an adjustable connection between the cam and the reciprocating part of the machine for effecting movement of the cam during the shaping operation.

5. A machine for shaping tubular or cylindrical articles, such as metal tubes or containers, by expanding or bulging the same, comprising in combination means for supporting the work; a tool rotatable about a constant axis, said tool being provided with one or more carrier members mounted in the tool for radial displacement during rotation; a pressure member associated with each carrier member for movement therewith to an outer exposed and operative position wherein said pressure members engage and apply pressure to the interior of the work for shaping same; means for effecting rotation of said tool; means for effecting longitudinal movement of the work simultaneously with the rotation of the tool; and means associated with said tool arranged to automatically control the outward radial displacement of said pressure members.

6. A machine for shaping tubular or cylindrical articles, such as metal tubes or containers, by expanding or bulging the same, comprising in combination means for supporting the work; means for effecting longitudinal movement of the work; a tool rotatable about a constant axis, having pivoted levers and means co-operating therewith for displacing same outwards to an operative position wherein they engage and apply pressure at the interior of the work for shaping same; means associated with said levers for returning them to an inoperative position; means for effecting rotation of said tool simultaneously with said longitudinal movement of the work; and means associated with said tool arranged to automatically control the outward radial displacement of said levers.

7. A machine for shaping tubular or cylindrical articles, such as metal tubes or containers, by expanding or bulging the same, comprising in combination means for supporting the work; means for effecting longitudinal movement of the work; a tool rotatable about a constant axis, said tool comprising a number of balls, and wedge-like members movable to displace said balls radially of the tool axis to cause them to engage and apply pressure to the interior of the work for shaping same; means associated with said wedge-like members arranged to automatically control the displacement of said balls; and means for effecting rotation of said tool simultaneously with the said longitudinal movement of the work.

8. A machine for shaping tubular or cylindrical articles, such as metal tubes or containers, by expanding or bulging the same, comprising in combination means for supporting the work; means for effecting longitudinal movement of the work; a tool rotatable about a constant axis, said tool being provided with a carrier member mounted for radial displacement by centrifugal force during rotation, and a roller member mounted on said carrier member adapted upon said radial displacement to engage and apply pressure to the interior of the work for shaping same; means for effecting rotation of said tool simultaneously with the axial or longitudinal movement of the work; and means associated with said carrier member arranged to automatically control the outward radial displacement of said carrier member and roller.

JOHN ARTHUR DOVE.